(12) United States Patent
Kumar et al.

(10) Patent No.: US 8,112,703 B2
(45) Date of Patent: Feb. 7, 2012

(54) AGGREGATE TAG VIEWS OF WEBSITE INFORMATION

(75) Inventors: Amit Kumar, San Jose, CA (US);
Priyank S. Garg, San Jose, CA (US);
Joshua E. Schachter, Mountain View, CA (US); Stephen L. Hood, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 938 days.

(21) Appl. No.: 11/491,438

(22) Filed: Jul. 21, 2006

(65) Prior Publication Data
US 2008/0034279 A1 Feb. 7, 2008

(51) Int. Cl.
*G06F 17/21* (2006.01)
(52) U.S. Cl. .......................... 715/234; 715/205; 715/254
(58) Field of Classification Search .................. 715/234, 715/205, 254
See application file for complete search history.

(56) References Cited

U.S. PATENT DOCUMENTS

| 5,890,172 | A | * | 3/1999 | Borman et al. ............... 715/205 |
| 5,933,827 | A | | 8/1999 | Cole et al. |
| 5,944,790 | A | | 8/1999 | Levy |
| 6,604,143 | B1 | | 8/2003 | Nagar et al. |
| 7,266,762 | B1 | | 9/2007 | Chakrabarti et al. |
| 7,546,530 | B1 | * | 6/2009 | Shuster et al. ............... 715/272 |
| 7,668,821 | B1 | * | 2/2010 | Donsbach et al. ............. 705/27 |
| 7,685,209 | B1 | * | 3/2010 | Norton et al. ................. 707/803 |
| 2002/0013792 | A1 | * | 1/2002 | Imielinski et al. ............. 707/523 |
| 2002/0073115 | A1 | * | 6/2002 | Davis .......................... 707/500.1 |
| 2003/0126560 | A1 | | 7/2003 | Kurapati et al. |
| 2003/0221162 | A1 | | 11/2003 | Sridhar |
| 2005/0256867 | A1 | * | 11/2005 | Walther et al. ................. 707/5 |
| 2006/0059144 | A1 | | 3/2006 | Canright et al. |
| 2006/0101064 | A1 | * | 5/2006 | Strong et al. ................. 707/102 |
| 2006/0161635 | A1 | * | 7/2006 | Lamkin et al. ............... 709/217 |
| 2006/0242553 | A1 | | 10/2006 | Kulas |
| 2007/0067331 | A1 | * | 3/2007 | Schachter et al. ............ 707/102 |
| 2007/0078832 | A1 | * | 4/2007 | Ott et al. ...................... 707/3 |
| 2007/0106721 | A1 | * | 5/2007 | Schloter ....................... 709/200 |
| 2007/0130207 | A1 | * | 6/2007 | Pate et al. .................... 707/104.1 |

(Continued)

OTHER PUBLICATIONS

TagCloud; TagCloud.com beta; Jun. 10, 2005; IonZoft, Inc; "Welcome to TagCloud.com", "About TagCloud.com". http://web.archive.org/web/20050610023637/www.tagcloud.com/index.php.*

(Continued)

*Primary Examiner* — Doug Hutton, Jr.
*Assistant Examiner* — Andrew Dyer
(74) *Attorney, Agent, or Firm* — Hickman Palermo Truong & Becker LLP; Daniel D. Ledesma

(57) ABSTRACT

A technique is provided for providing an aggregate tag view of a website that comprises a plurality of webpages that each has a corresponding URL. A tag is a set of one or more words that have been associated with a URL and is typically created by a user to describe content of the webpage corresponding to the URL. Initially, a request is received to display information pertaining to a website. In response to the request, a plurality of tags associated with the website is displayed. A first subset of the plurality of tags is associated with a particular URL. A second subset of the plurality of tags is associated with one or more URLs that are not the particular URL. Alternatively, or in addition to an aggregate tag view tag-related information for each URL of the website is provided, in response to the initial request.

42 Claims, 3 Drawing Sheets

U.S. PATENT DOCUMENTS

| | | | |
|---|---|---|---|
| 2007/0156636 A1* | 7/2007 | Norton et al. | 707/1 |
| 2007/0226077 A1 | 9/2007 | Frank et al. | |
| 2007/0288454 A1* | 12/2007 | Bolivar et al. | 707/5 |
| 2007/0288514 A1* | 12/2007 | Reitter et al. | 707/104.1 |
| 2008/0114644 A1* | 5/2008 | Frank et al. | 705/14 |

OTHER PUBLICATIONS

Biddulph, Matt; Introducing del.icio.us; Nov. 10, 2004; xml.com; "Looking at Tagging Behavior"; http://www.xml.com/pub/a/2004/11/10/delicious.html.*

Medynskiy et al.; Using Hybrid Networks for the Analysis of Online Software Development Communities; Apr. 27, 2006; ACM; pp. 513-515.*

Adam Mathes; Folksonomies-Cooperative Classifiacation and Communication Through Shared Metadata; Dec. 2004; University of Illinois, Urbana-Champaign; pp. 1-19.*

David Weinberger; Tagging and Why It Matters; May 13, 2005; Harvard University; pp. 1-4.*

Cade Metz; Flickr (Beta); Mar. 2, 2005; PCMag.com; http://www.pcmag.com/article2/0,2817,1771897,00.asp?tab-FullReview; Last Accessed Feb. 7, 2011; pp. 1-5.*

Jonny Baker; Flickr-Online Photo Sharing; Jan. 5, 2007; http://jonnybaker.blogs.com/jonnybaker/2006/01/flickr_online_p.html; last accessed Feb. 7, 2011; pp. 1-3).*

Microsoft Computer Dictionary; May 1, 2002; Microsoft Press; Fifth Edition; p. 399.*

The Internet Archive: Building an 'Internet Library;' Nov. 30, 2001; Internet Archive; pp. 1-2.*

Chris Taylor; An Introduction to Metadata; Jul. 29, 2003; University of Queensland Library; pp. 1-5.*

Milstein et al.; Google: The Missing Manual; Mar. 10, 2006; O'Reilly Media; Second Edition; pp. 341-374.*

"Yahoo Site Explorer" downloaded from the Internet on Jul. 9, 2010 < http://web.archive.org/web/20060104084307/siteexplorer.search.yahoo.com/learnmore > (3 pages).

"Tag_(metadata)" downloaded from the Internet on Jul. 9, 2010 < http://web.archive.org/web/20060913000000/http:/en.wikipedia.org/wiki/Tag_%28metadata... > (2 pages).

* cited by examiner

AGGREGATE TAG VIEWS OF WEBSITE INFORMATION

FIELD OF THE INVENTION

The present invention relates generally to user tagging and, more specifically, to a technique for providing aggregate tag views of a website.

BACKGROUND

A tag is a keyword or descriptive term associated with an item as a means of classification. Tags are usually chosen informally and personally by a user of the item. For example, a user discovers a webpage that discusses Indian cooking. The user creates a tag that associates one or more words with the webpage, such as "Indian cooking".

Thus, tags are not usually part of a formally defined classification scheme. Tags are typically used in dynamic, flexible, automatically generated internet taxonomies for online resources such as computer files, web pages, digital images, and internet bookmarks. Some users use tags as an alternative to the "Bookmark" option provided by the major web browsers.

Typically, an item will have one or more tags associated with it, as part of an automated classification software or system. MyWeb (provided by Yahoo!) and Del.icio.us are popular social bookmarking sites that provide an automated classification system. The system provides links to other items which share that keyword tag, or even to specified collections of tags. This allows for multiple "browseable paths" through the items which can quickly and easily be altered by the collection's administrator, with minimal effort and planning.

Thus far, tagging has been "personal" in that tagging is directed towards end-users that are tagging items for their own use. Tagging is also directed towards other end-users who are able to use others' tags for their use (e.g. searching across all tags). To extend the "Indian cooking" example, the user-created tag is made public by allowing other users to search for websites or webpages that discuss "Indian cooking" and having the URL associated with the "Indian cooking" webpage appear in the search results. However, there is no current mechanism to provide tagging information to owners of websites, in which multiple webpages of a website have been tagged, in an organized and meaningful way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In addition to end-users, tags may provide invaluable information to owners of websites (hereinafter "Site Owners") because websites usually comprise multiple webpages that each contain varying content. For example, Site Owners may use the tag information to verify if the popular webpages (i.e., the ones that are tagged most frequently) are the ones the Site Owner also considers important. Similarly, an aggregated report on tags from the site indicates what end-users generally think the website is about. Aggregate tag information presents an overall view of the website to a Site Owner and illustrates the differences between the popular and not-so-popular webpages. With this information, a Site Owner may remove some webpages from the site, invest more time and money into developing and maintaining the popular webpages, alter the content of one or more webpages, and/or advertise differently the one or more products/services provided by the Site Owner.

A user, typically a Site Owner, issues a request (e.g. via a browser interface on the user's computer) to retrieve aggregate tag information pertaining to a website. In response to the request, a plurality of tags associated with the multiple webpages is provided to the user to be displayed (e.g. via the browser interface). In one approach, tag-related information is provided for each webpage of the website.

In the ensuing description, associating tags with URLs and associating tags with webpages will be used interchangeably. When a tag is associated with a URL, the tag is inherently associated with a webpage because a webpage and a URL have a one-to-one relationship.

Aggregate Information

Figure 1:
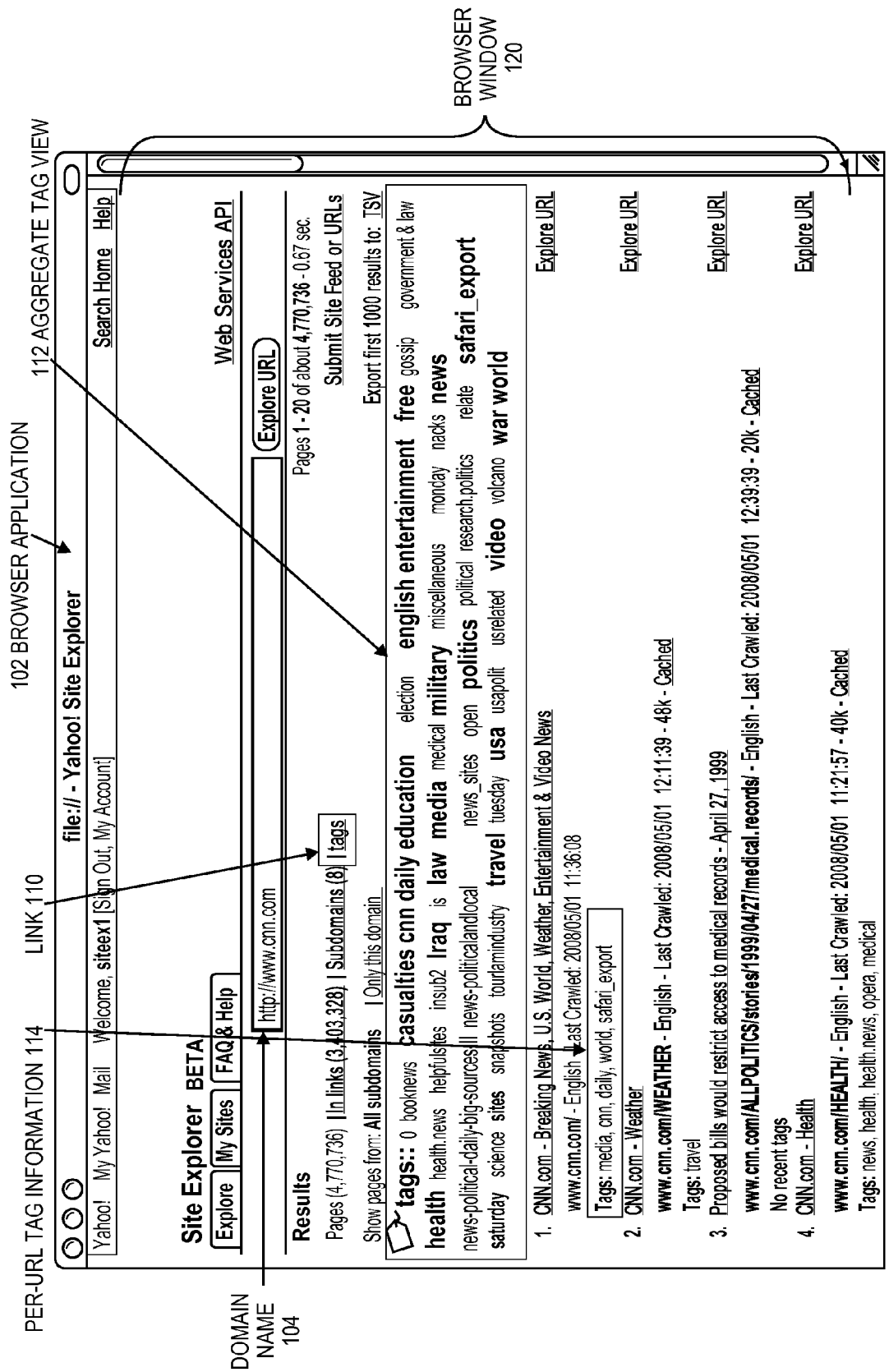
FIG. 1 is a diagram that illustrates an aggregate tag view of a plurality of tags of a website, according to an embodiment of the invention.

FIG. 1 is a diagram that illustrates an aggregate tag view of a plurality of tags associated with a website and a per-URL tag view of webpages of the website, according to an embodiment of the invention. A browser application 102 comprises a browser window 120 that contains a field to accept a domain name 104, such as "www.cnn.com". After domain name 104 is issued as a query, results are returned to be displayed in browser window 120. Such results may include a link to view the various webpages of the website, a link to view the webpages that link to the website, and a link (i.e. link 110) to view aggregate tag view 112.

Aggregate tag view 112 comprises a plurality of tags associated with multiple webpages of the website indicated by domain name 104. The plurality of tags may be displayed in alphabetical order, in order of the most frequently used tag, any other order, or no order. Not all tags that have been associated with the website have to be provided to and displayed in browser window 120. Two or more webpages (and/ or their corresponding URLs) of the website may be represented by the plurality of tags in aggregated tag view 112.

Aggregate tag view 112 may be helpful to a Site Owner in many respects. This information may indicate that other users view the website differently than the way the Site Owner views the website. For example, a Site Owner may post articles on current politics with a few articles on health. Aggregated tag view 112 may illustrate tags with a majority of health-related terms indicating that users associate the website more with health than they do with politics. The Site Owner may use this knowledge to change 1) what type of articles to post, 2) how the website and/or webpage(s) are advertised, 3) what kind of advertisements to include on the website, etc.

In one embodiment, the plurality of tags is only provided to an authorized owner of the website or an authorized agent of the owner. Any mechanism may be used to authenticate the user as the Site Owner and an agent thereof. Typically, this detailed aggregate tag information is useful primarily for Site Owners and could be used by a competitor to the competitor's advantage if not protected. For example, if a competitor had access to this information, the competitor might copy the manner and style in which a Site Owner markets his/her products and/or services by discovering what other users "think" about the website and its corresponding webpages. However, a typical Site Owner would prefer that his/her competitors are not aware of what users associate with the website, especially those topics (indicated by the tags) that are very popular.

In one embodiment, a count for each of the plurality of tags is provided to be displayed (e.g. via browser application 102). A count indicates the number of times a particular tag has been associated with one or more URLs of the plurality of URLs.

In one embodiment, the font size, font type, and/or color of a tag in aggregate tag view 112 is based on a number of times the tag has been associated, by any user, with a URL of the plurality of URLs. A first displayed tag that is larger than a second displayed tag indicates that the first displayed tag has been associated more with one or more URLs of the plurality of URLs than the second displayed tag has been. In FIG. 1, for example, the tag "politics" is larger than the tag "usa" indicating that "politics" has been associated more with one or more webpages of www.cnn.com than "usa" has been. Alternatively, the font size, font type, and/or color of various tags may be used to illustrate the relative difference in frequency among the various tags, as opposed to absolute difference in frequency.

In one embodiment, one or more of the tags in aggregate tag view 112 are selectable (e.g., by a computer mouse). Selection of one of these tags may cause a new page to be generated (i.e., generating a new window for the new page or opening up the new page in the same window). The new page lists the website's URLs that have been associated with the selected tag.

In one embodiment, in addition to aggregated tag view 112, a number is shown that indicates a number of times that one or more tags have been associated with one or more URLs of the plurality of URLs within a certain period of time. For example, a number next to aggregate tag view 112 may be 134, which indicates that 134 tags have been associated with one or more URLs of www.cnn.com in the last 24 hours. The time period may be any time period, whether of years, months, weeks, days, hours, minutes, or seconds.

Additionally, a number may be associated with each tag that indicates a number of times that the particular tag has been associated with one or more URLs of the plurality of URLs within a certain period of time. For example, in FIG. 1, a number may appear adjacent to tags "daily", "media", "travel", and/or any other tag in aggregated tag view 112 or somewhere else within browser window 120.

In one embodiment, only a subset of the plurality of URLs is associated with the tags in the plurality of tags. For example, the tags that have been associated with the most "popular" webpages (e.g. the webpages associated with the most tags) are represented in aggregated tag view 112, while the tags of the least popular webpages are not represented in aggregated tag view 112. According to embodiments discussed above, the tag "travel" for a more popular webpage may be represented in aggregated tag view 112 by the count, font size, font type, and/or color but the tag "travel" for a less popular webpage might not be.

Figure 2:
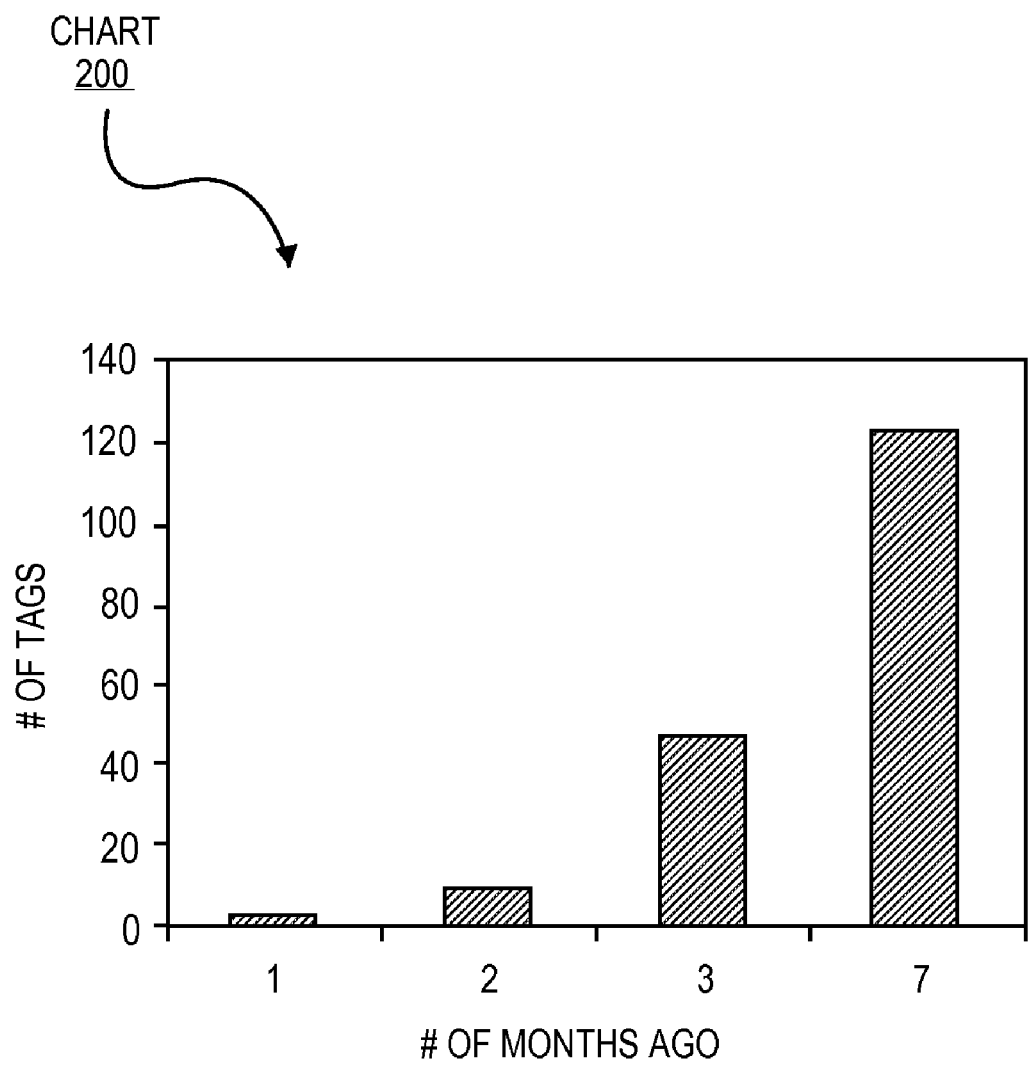
FIG. 2 is a chart that illustrates a number of tags that have been associated with any URL of a website within a certain period of time, according to an embodiment of the invention.

In one embodiment, a chart is provided along with aggregated tag view 112. The chart (e.g. a histogram) illustrates a number of times that one or more tags of the plurality of tags have been associated with one or more URLs of the plurality of URLs within a certain period of time. For example, if a Site Owner desires to see how many tags have been associated with his website in the previous four months, with a metric for each month, then four values or bars will be generated, one for each of the four months. FIG. 2 illustrates a chart 200 that is an example of a number of tags that have been associated with one or more URLs of a particular website over the last four months. Chart 200 indicates the website was relatively popular among end-users four months ago. However, chart 200 also indicates that end-users have not associated many tags with the website within the last few months and that the number has been falling rapidly.

A chart (e.g. histogram) may be generated automatically along with aggregated tag view 112, or the chart may be generated after receiving specific user input. A browser interface, which a user (e.g. Site Owner) may be using to view aggregated tag view 112, may contain one or more fields to accept user input regarding the time frame and how the information is to be displayed.

Per-URL Information

According to one embodiment of the invention, tag-related information for each webpage of multiple webpages of a website is provided. Not all webpages of the website have to be listed when the tag-related information is displayed. For example, tag-related information for the least "popular" webpages may be omitted. Tag-related information for each webpage may be provided in addition to or instead of the plurality of tags (e.g. aggregated tag view 112) described above. When link 110 is selected, in addition to providing aggregate tag view 112, per-URL information (e.g. per-URL information 114) may also be provided to browser application 102 to be displayed. Per-URL tag information 114 in FIG. 1 indicates tags that have been associated with the webpage "www.cnn.com". Tag-related information may comprise any one of, or any combination of, the following embodiments.

In one embodiment, the tag-related information for each URL includes a number of times (i.e. count) that a particular tag has been associated with the URL. This number indicates what users generally "think" the webpage is about.

In one embodiment, the tag-related information for each URL includes a number of times that a particular tag has been associated with the URL within a certain period of time. If the period of time is limited to the last few days, for example, then this number may indicate what users recently thought the webpage was about. As an example, if a webpage is generally about current politics and occasionally about health, then this number may indicate the webpage has recently been associated with health based on a recent popular health article posted on the webpage.

In one embodiment, a count associated with a particular tag is indicated by the font size, font type, and/or color of the displayed tag, similar to the approach described above with respect to the aggregated information.

In one embodiment, the tag-related information for each URL includes a number of times that one or more tags have been associated with the URL within a certain period of time. Depending on the period of time, this number may indicate whether the webpage is popular today, over time, or was ever popular. For example, if the period of time is the last five days, then the number may indicate whether the webpage is recently popular. If the period of time is the month of December in 2005, then the number may indicate whether the webpage was popular at that time.

In one embodiment, the tag-related information for each URL includes a chart that indicates a number of times that one or more tags have been associated with the URL within a certain period of time. A chart (e.g. a histogram) in this embodiment illustrates the change in popularity of a webpage, as opposed to the corresponding website, over time. An example of a chart is given above with respect to aggregate tag information.

In one embodiment, the tag-related information for each URL includes (a) a first date on which the first tag was associated with the URL and/or (b) a second date on which the last tag was associated with the URL. In this manner, a user (e.g. the Site Owner) may discover when the first tag was created for the URL. This information may illustrate the difference between when the webpage was created and when the first tag was associated with the webpage. The second date may indicate whether the webpage is still "popular". If a year has elapsed since a tag was associated with the webpage, then the webpage is no longer "popular". With this information, further development of that webpage (or the website) may cease or continue in a different manner, depending on the goals of the Site Owner. Lastly, combining the second date with a histogram may provide a more comprehensive indication of the recent popularity of the webpage.

Hardware Overview

Figure 3:
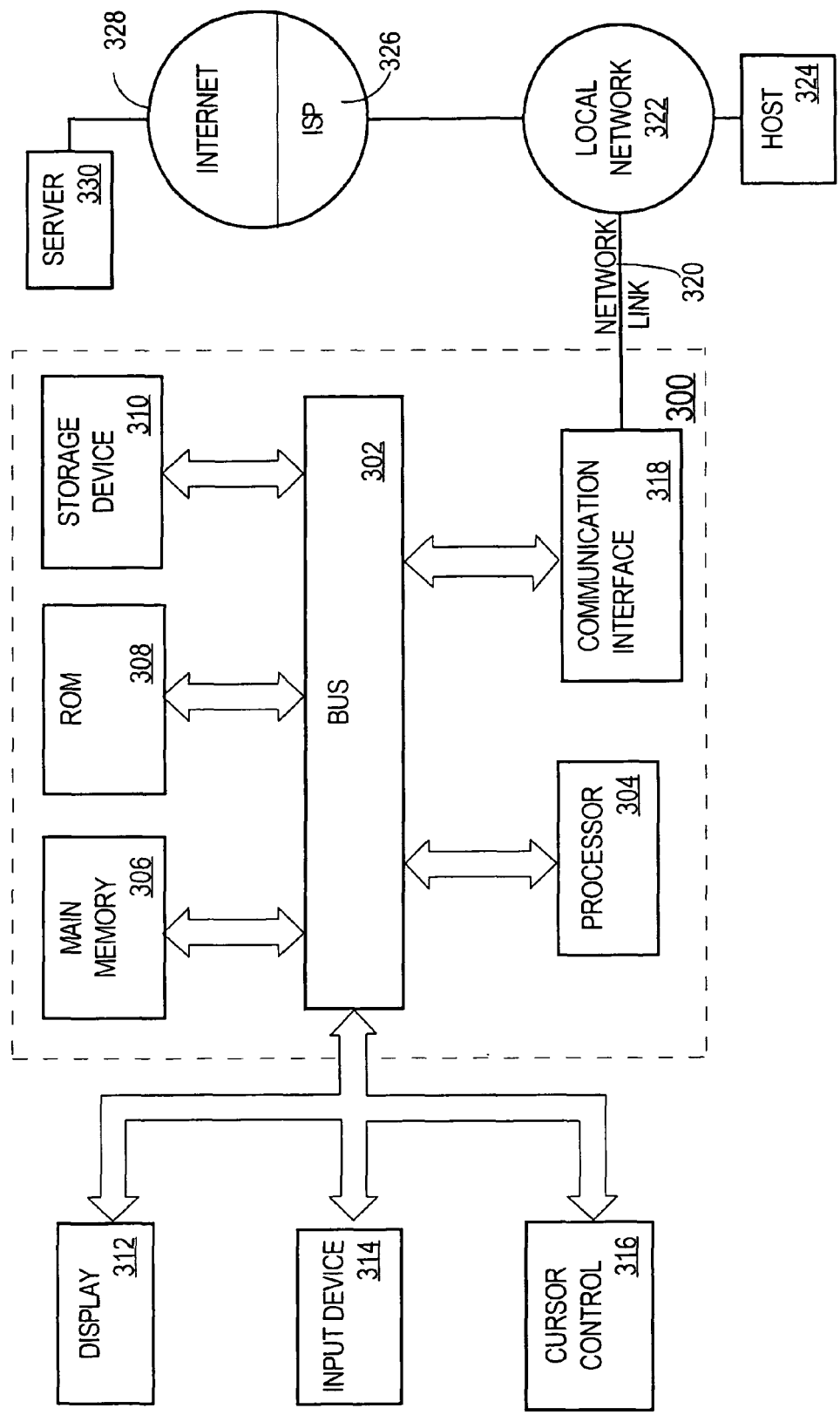
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising the steps of:
   receiving, at a first website, a request for information pertaining only to a second website that is different than the first website, wherein the request specifies a Uniform Resource Locator (URL) or a domain name of the second website;
   wherein the second website comprises a plurality of webpages that correspond to a plurality of URLs;
   in response to receiving the request, generating a page that includes a plurality of tags associated with the second website;
   causing the page to be displayed;
   wherein each tag of the plurality of tags is (a) a set of one or more words associated with a URL in the plurality of URLs and (b) created, before the request is received, by a user, other than any author of content of a webpage that corresponds to said URL, to describe the content of the webpage, wherein the user selected the set of one or more words;
   wherein each tag of the plurality of tags is not contained within the content of the webpage that corresponds to the URL with which said each tag is associated;
   wherein a first subset of the plurality of tags are associated with a particular URL of the plurality of URLs;
   wherein a second subset of the plurality of tags are associated with one or more URLs, of the plurality of URLs, that do not include the particular URL;
   wherein the request does not specify any of the one or more URLs.

2. The method of claim 1, further comprising authenticating the user that sent the request as one authorized to receive the plurality of tags, wherein causing the page to be displayed includes causing the page to be displayed only to an authorized owner of the second website or to an authorized agent of said owner.

3. The method of claim 1, wherein:
   one or more tags of the plurality of tags is selectable; and
   the method further comprising, after providing the plurality of tags:
      receiving input that indicates a selection of one of the one or more tags;
      in response to receiving the input, generating a new page that lists all the URLs of the second website that have been associated with the selected tag; and
      causing the new page to be displayed.

4. The method of claim 1, wherein:
   generating the page includes generating a count for each of the plurality of tags, wherein a particular count indicates a number of times a particular tag has been associated with one or more URLs of the plurality of URLs; and
   the page includes the count for each of the plurality of tags.

5. The method of claim 1, wherein:
   one or more attributes of a displayed tag indicates a number of times the displayed tag has been associated with one or more URLs, of the plurality of URLs, relative to other tags of the plurality of tags; and
   the one or more attributes includes one or more of the following: font size of the displayed tag, font type of the displayed tag, or color of the displayed tag.

6. The method of claim 1, wherein:
   generating the page includes determining a number of times in a certain period of time that one or more tags of the plurality of tags have been associated with one or more URLs of the plurality of URLs; and
   the page includes said number of times.

7. The method of claim 1, wherein:
   generating the page includes generating a chart that indicates a number of times one or more tags of the plurality of tags has been associated with one or more URLs of the plurality of URLs within a certain period of time; and
   the method further comprising causing the chart to be displayed.

8. The method of claim 1, further comprising:
   prior to receiving the request:
      receiving first data that associates each tag of the plurality of tags with a URL of the plurality of URLs, and
      receiving second data that associates the plurality of URLs with the second website; and
   in response to receiving the request:
      using the second data to identify the plurality of URLs, and
      using the first data to identify the plurality of tags.

9. The method of claim 1, further comprising:
receiving, at the first website, a second request for information pertaining only to a third website that is different than the first website and the second website, wherein the second request specifies a second URL or a second domain name of the third website;
wherein the third website comprises a second plurality of webpages that correspond to a second plurality of URLs;
in response to receiving the second request, generating a second page that includes a second plurality of tags associated with the third website;
causing the second page to be displayed;
wherein each tag of the second plurality of tags is (a) a set of one or more words associated with a URL in the second plurality of URLs and (b) created, before the request is received, by a second user, other than any author of content of a webpage that corresponds to said URL, to describe the content of the webpage, wherein the second user selected the set of one or more words;
wherein a first subset of the second plurality of tags are associated with a second particular URL of the second plurality of URLs;
wherein a second subset of the second plurality of tags are associated with one or more second URLs, of the second plurality of URLs, that are not the second particular URL;
wherein the second request does not specify any of the one or more second URLs.

10. The method of claim 1, wherein the URL or the domain name is specified in a text field of a particular webpage of the first website.

11. One or more storage media storing instructions which, when executed by one or more processors, cause performance of the steps recited in claim 1.

12. One or more storage media storing instructions which, when executed by one or more processors, cause performance of the steps recited in claim 2.

13. One or more storage media storing instructions which, when executed by one or more processors, cause performance of the steps recited in claim 3.

14. One or more storage media storing instructions which, when executed by one or more processors, cause performance of the steps recited in claim 4.

15. One or more storage media storing instructions which, when executed by one or more processors, cause performance of the steps recited in claim 5.

16. One or more storage media storing instructions which, when executed by one or more processors, cause performance of the steps recited in claim 6.

17. One or more storage media storing instructions which, when executed by one or more processors, cause performance of the steps recited in claim 7.

18. One or more storage media storing instructions which, when executed by one or more processors, cause performance of the steps recited in claim 8.

19. One or more storage media storing instructions which, when executed by one or more processors, cause performance of the steps recited in claim 9.

20. One or more storage media storing instructions which, when executed by one or more processors, cause performance of the steps recited in claim 10.

21. A machine-implemented method comprising the steps of:
receiving, at a first website, a request for information pertaining only to a second website that is different than the first website, wherein the request specifies a Uniform Resource Locator (URL) or a domain name of the second website;
wherein the second website comprises a plurality of webpages that correspond to a plurality of URLs;
in response to receiving the request, generating a page that includes, for each URL of two or more URLs of the plurality of URLs, (1) URL data that identifies said each URL and (2) tag-related information associated with said each URL; and
causing the page to be displayed;
wherein for said each URL, the associated tag-related information includes one or more tags, wherein each of the one or more tags is (a) a set of one or more words associated with said each URL and (b) created, before the request is received, by one or more users other than any author of content of a webpage that corresponds to said each URL, to describe the content of the webpage, wherein the one or more users selected the set of one or more words;
wherein each of the one or more tags is not contained within the content of the webpage that corresponds to the URL with which said each tag is associated;
wherein the request does not specify any of the plurality of URLs.

22. The method of claim 21, further comprising authenticating the user that sent the request as one authorized to receive the tag-related information associated with said each URL, wherein providing tag-related information includes providing the tag-related information only to an authorized owner of the second website or to an authorized agent of said owner.

23. The method of claim 21, wherein the tag-related information for each URL includes a number of times a particular tag has been associated with said each URL.

24. The method of claim 21, wherein the tag-related information for each URL includes a number of times a particular tag has been associated with said each URL within a certain period of time.

25. The method of claim 21, wherein:
the tag-related information for each URL includes multiple tags that have been associated with said each URL;
one or more attributes of a displayed tag indicates the number of times the displayed tag has been associated with said each URL of the subset relative to other tags associated with said each URL; and
the one or more attributes includes one or more of the following: font size of the displayed tag, font type of the displayed tag, or color of the displayed tag.

26. The method of claim 21, wherein the tag-related information for each URL includes a number of times one or more tags have been associated with said each URL within a certain period of time.

27. The method of claim 21, wherein the tag-related information for each URL includes a chart that indicates a number of times one or more tags have been associated with said each URL within a certain period of time.

28. The method of claim 21, wherein the tag-related information for each URL includes at least one of a first date of when the first tag was associated with said each URL or a second date of when the last tag was associated with said each URL.

29. The method of claim 21, further comprising:
prior to receiving the request:
receiving first data that associates each tag of the plurality of tags with a URL of the plurality of URLs, and receiving second data that associates the plurality of URLs with the second website; and in response to receiving the request:
using the second data to identify the plurality of URLs, and
using the first data to identify the plurality of tags.

30. The method of claim 21, further comprising:

receiving, at the first website, a second request for information pertaining only to a third website that is different than the first website and the second website, wherein the second request specifies a URL or a domain name of the second website;

wherein the third website comprises a second plurality of webpages that correspond to a second plurality of URLs;

wherein the second request does not specify any of the second plurality of URLs;

in response to receiving the second request, for each URL of two or more URLs of the second plurality of URLs, generating a second page that includes (1) second URL data that identifies said each URL and (2) second tag-related information associated with said each URL; and causing the second page to be displayed;

wherein for said each URL, the associated second tag-related information includes one or more tags, wherein each of the one or more tags is (a) a set of one or more words associated with said each URL and (b) created, before the second request is received, by one or more second users other than any author of content of a webpage that corresponds to said each URL, to describe the content of the webpage, wherein the one or more second users selected the set of one or more words.

31. The method of claim 21, wherein the URL or the domain name is specified in a text field of a particular webpage of the first website.

32. One or more storage media storing instructions which, when executed by one or more processors, cause performance of the steps recited in claim 21.

33. One or more storage media storing instructions which, when executed by one or more processors, cause performance of the steps recited in claim 22.

34. One or more storage media storing instructions which, when executed by one or more processors, cause performance of the steps recited in claim 23.

35. One or more storage media storing instructions which, when executed by one or more processors, cause performance of the steps recited in claim 24.

36. One or more storage media storing instructions which, when executed by one or more processors, cause performance of the steps recited in claim 25.

37. One or more storage media storing instructions which, when executed by one or more processors, cause performance of the steps recited in claim 26.

38. One or more storage media storing instructions which, when executed by one or more processors, cause performance of the steps recited in claim 27.

39. One or more storage media storing instructions which, when executed by one or more processors, cause performance of the steps recited in claim 28.

40. One or more storage media storing instructions which, when executed by one or more processors, cause performance of the steps recited in claim 29.

41. One or more storage media storing instructions which, when executed by one or more processors, cause performance of the steps recited in claim 30.

42. One or more storage media storing instructions which, when executed by one or more processors, cause performance of the steps recited in claim 31.

* * * * *